3,641,069
6-FLUORO STEROIDS OF THE ANDROSTANE SERIES

Georg Anner, Basel, and Charles Meystre, Reinach, Basel-Land, Switzerland, assignors to Ciba Corporation, Summit, N.J.
No Drawing. Filed Apr. 29, 1969, Ser. No. 820,332
Claims priority, application Switzerland, May 6, 1968, 6,669/68
Int. Cl. C07c *169/20, 169/22*
U.S. Cl. 260—397.45      9 Claims

ABSTRACT OF THE DISCLOSURE

New 6-fluoro steroids of the androstane series having the Formula I

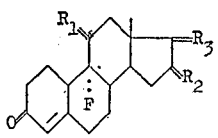

(I)

in which $R_1$ represents a free $\beta$-positioned hydroxyl group together with hydrogen, or an oxo group, $R_2$ represents an $\alpha$- or $\beta$-positioned methyl group together with hydrogen, or a methylene group and $R_3$ a free, esterified or etherified hydroxyl group together with hydrogen, or an oxo group, and their 1-dehydro-derivatives have antiinflammatory activity. They are prepared by methods known in the art.

In the new compounds of the invention the said esterified hydroxyl groups are above all derived from organic carboxylic acids of the aliphatic, alicyclic, aromatic or heterocyclic series, especially from acids containing 1 to 18 carbon atoms, for example formic, acetic or propionic acid, a butyric or valeric acid such as n-valeric acid, or from trimethyl acetic or trifluoroacetic acid, from caproic acids such as $\beta$-trimethylpropionic acid or diethylacetic acid, from oenanthic, caprylic, pelargonic, capric or undecylic acids, for example undecylenic acid, lauric, myristic, palmitic or stearic acids, for example oleic acid, cyclopropanecarboxylic, cyclobutane-, cyclopentane- or cyclohexane-carboxylic acid, cyclopropylmethanecarboxylic, cyclobutylmethanecarboxylic, cyclopentylethanecarboxylic, cyclohexylethanecarboxylic acid, a cyclopentyl-, cyclohexyl- or phenyl-acetic or -propionic acid, from benzoic acid, a phenoxyalkane acid such as phenoxyacetic acid, from dicarboxylic acids such as succinic, phthalic, quinolic acid, from furan-2-carboxylic, 5-tertiary butyl-furan-2-carboxylic, 5-bromo-furan-2-carboxylic acid, from nicotinic or isonicotinic acid, or from sulphonic acids such as benzenesulphonic acids or from inorganic acids such as phosphoric or sulphuric acids.

Particularly suitable etherified hydroxyl groups are those which are derived from alcohols containing 1 to 8 carbon atoms, such as lower aliphatic alkanols, such as ethanol, methanol, propanol, isopropanol, a butyl or amyl alcohol, or from araliphatic alcohols, especially from monocyclic aryl-lower aliphatic alcohols such as benzyl alcohol, or from heterocyclic alcohols such as $\alpha$-tetrahydropyranol or -furanol.

There should be specially mentioned $\Delta^{1,4}$-16$\alpha$-methyl-6$\alpha$,9$\alpha$-difluoro-11$\beta$-hydroxy - 3,17 - dioxo-androstadiene, $\Delta^{1,3}$-16$\alpha$-methyl - 6$\alpha$,9$\alpha$ - difluoro-11$\beta$,17$\beta$-dihydroxy-3-oxo-androstadiene, $\Delta^{1,4}$-16$\beta$-methyl - 6$\alpha$,9$\alpha$ - difluoro-11$\beta$-hydroxy-3,17-dioxo-androstadiene, $\Delta^{1,4}$-16$\alpha$-methylene-6$\alpha$,9$\alpha$-difluoro-11$\beta$-hydroxy - 3,17 - dioxo-androstadiene, the corresponding 11-oxo compounds and the corresponding compounds saturated in the 1,2-position.

The new compounds possess valuable pharmacological properties. Inter alia, they act especially against inflammations as can be shown in animal tests, for example on parenteral or oral administration of doses from 0.1 to 1.0 mg./kg. bodyweight to the rat. Furthermore, as can be shown in animal tests, for example on the rat, they have a local anti-inflammatory activity. The new compounds may therefore, be used as antiphlogistics. The new compounds are also valuable intermediates for the manufacture of other useful substances, especially of pharmacologically active compounds.

Special mention deserves $\Delta^{1,4}$-16$\alpha$-methyl-6$\alpha$,9$\alpha$-difluoro-11$\beta$-hydroxy - 3,17 - dioxo-androstadiene which on oral administration in doses of 1.0 mg./kg. to rats produces a distinct anti-inflammatory effect.

The new compounds of this invention are manufactured in known manner.

Preferably, they are manufactured according to a process (a) which is characterized in that in compounds of the formula

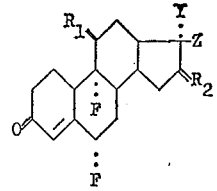

(II)

in which Y represents hydrogen or a free hydroxyl group and Z stands for a pregnane side-chain oxygenated in positions 20 and/or 21, and $R_1$ and $R_2$ have the same meanings as in formula (I), or in their 1-dehydro derivatives, the grouping

in position 17 is degraded in known manner to the oxo group or to the hydroxyl group.

According to another process (b) the starting material used may be a compound of the Formula II in which Y represents hydrogen and Z a free, esterified or etherified hydroxyl group or Y+Z stand for an oxo group, into whose 1,2-position a double bond is introduced by a chemical or microbiologic route, or 1-dehydro derivatives of the compounds of the Formula II, in which Y and Z have these meanings, may be saturated in the 1,2-position.

According to another process (c) in compounds of the Formula II, in which $R_1$ has the same meaning as in Formula I, Y represents hydrogen and Z a free, esterified or etherified hydroxyl group or Y+Z stand for an oxo group, at least one of the substituents $R_1$ and Y+Z being an oxo group, after having provided intermediate selective protection for the 3-oxo group, the 11- and/or 17-oxo group is/are reduced to the hydroxyl group, or in compounds of the Formula II, in which $R_1$, Y and Z have the same meanings and at least one of the groups $R_1$ and Y+Z represents a hydroxyl group together with hydrogen, or in their 1-dehydro derivatives, the 11- and/or 17-hydroxyl group(s) is/are dehydrogenated to the oxo group.

According to another known process (d) in compounds of the formula

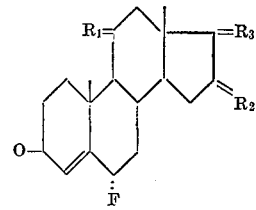

(III)

in which $R_1$ represents a hydroxyl group together with hydrogen and $R_2$ and $R_3$ have the same meanings as in Formula I, or in their 1-dehydro derivatives, the $9\alpha$-fluorine atom is introduced in known manner.

Compounds of the Formula I, that contain a hydroxyl group each in positions 17 and 11, are advantageously manufactured by the following process (e): The compounds of the Formula I containing a 17- and/or 11-oxo group are reduced with a complex light-metal hydride to form a compound of the formula

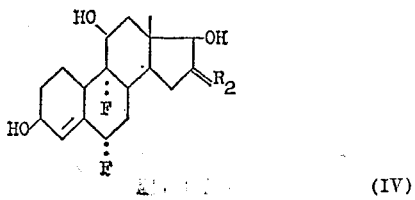

(IV)

and the 3-hydroxyl is selectively oxidized to the 3-oxo group.

Finally, in compounds of the Formula I, in which $R_3$ represents a free hydroxyl group together with a hydrogen atom, the hydroxyl group in the 17-position may be esterified or etherified in known manner (process $f$).

The process according to (a) may be performed in a variety of ways, preferably starting from compounds of the Formula II, in which Z represents an acetyl group or a free or esterified hydroxyacetyl group and Y represents a free hydroxyl group, or from their 1-dehydro derivatives. According to a particularly advantageous method such compounds are degraded to the 17-oxo compounds with sodium bismuthate in a suitable solvent, such as a lower aliphatic carboxylic acid, for example acetic acid, if desired or required in the presence of a tertiary organic base, such as pyridine. This degradation of the pregnane side-chain may also be performed with compounds that contain a 20-hydroxyl instead of the 20-oxo group.

Compounds of the Formula II, in which Y represents a hydroxyl group and Z a 20-hydroxypregnane side-chain which is unsubstituted or oxygenated in the 21-position, can be degraded to the 17-oxo compounds by means of sodium periodate or periodic acid, for example in an ethanolic or methanolic solution.

The 17,20-glycol group of the afore-mentioned starting materials may also be cleaved to the 17-oxo group with lead tetraacetate in the usual manner, for example in acetic acid or benzene.

Finally, the 17-oxo-androstane compounds of the Formula I are also accessible from the 20-oximes of 17-hydroxy-20-oxo-pregnanes of the Formula II according to Beckmann's rearrangement reaction, for example by treating the oximes with phosphorus oxychloride in pyridine at about 0° C., or with the use of similar variants of this reaction described in the literature.

When the above-mentioned Backmann's rearrangement of the 20-oximes is applied to compounds of the Formula II, in which Y represents a hydrogen atom and Z an acetyl group, the 17-amino compounds are obtained, from which the 17-hydroxy compounds and the 17-oxo compounds of the Formula I may be prepared. Thus, for example, the 17-amines may be directly converted with sodium nitrite in an acidic solution into the 17-hydroxy compounds, or the amines are treated with hypochlorous acid, for example, in ethanol, to furnish the corresponding N-chloroamines and, when the latter are dehydrochlorinated, for example by means of a base, they furnish the 17-imino compounds which on hydrolyzation give rise to the 17-oxo compounds.

The degradation of 20-oxopregnane compounds that contain no hydroxyl group in position 17 but may be oxygenated in position 21, containing, for example, a free or esterified hydroxyl group, can be performed microbiologically, for example according to the process of USA specification 2,904,472 by treatment with enzymes of the fungi of the genus Fusarium, for example of the species *Fusarium solani*.

According to the above-mentioned process (b) a double bond is introduced in known manner into compounds of the formula shown. Chemically this can be done, for example, by treating the starting materials with selenium dioxide in a tertiary alcohol, for example tertiary amyl alcohol, if desired in the presence of pyridine, or by bromination in position 2 and dehydrobromination by means of a tertiary base such as collidine- or lithium bromide in dimethylformamide. Microbiologically a 1,2-double bond can be introduced by incubating the starting materials, for example, with enzymes of microorganisms of the species *Corynebacterium simplex*, *Septomyxa affinis* or *Didymella lycopersici*.

The selective saturation of the 1,2-double bond in 1,4-dienes can be performed, for example, in known manner by treatment with lithium in liquid ammonia, for example in the presence of tetrahydrofuran or by catalytic hydrogenation with a noble metal catalyst, for example palladium. Another method is the selective hydrogenation in a homogenous phase with triphenylphosphine-rhodium chloride catalyst.

The process described under (c) is performed in the known manner. Thus, oxo groups in position 11 and/or 17 are advantageously reduced to the hydroxyl group with complex light-metal hydrides, for example sodium borohydride or lithium-aluminium hydride. This reduction requires intermediate protection being provided for the 3-oxo group and possibly also the 17-oxo group, for example by conversion into a 3- or 17-ketal or into a 3-enolether. After the oxo groups have been reduced, the protective groups are eliminated in known manner, for example by acid hydrolysis.

In process (d) a fluorine atom may be introduced both in compounds of the Formula III and in their 1-dehydro derivatives in the following manner: The 11-hydroxyl group is cleaved by treatment with a dehydrating agent, for example phosphorus oxychloride, in the presence of pyridine or advantageously by treatment with an H-halogenamide or -imide in a basic anhydrous agent in the presence of sulphur dioxide; the resulting 9,11-dehydro compound is converted into the corresponding N-bromohydrin, for example by means of hypobromous acid, especially with N-bromosuccinimide in the presence of perchloroic acid; hydrogen bromide is split off from the N-bromohydrin obtained for example with potassium acetate, and the resulting 9,11-epoxide is opened up with hydrogen fluoride in known manner, for example with anhydrous hydrogen fluoride, for example in dimethylformamide, or with aqueous hydrogen fluoride or with the adduct of urea to anhydrous hydrogen fluoride.

The reduction of the oxo groups to be performed in the above-mentioned process (f) may be performed, for example with lithium-aluminium hydride, sodium borohydride or tri-tertiary butoxy-lithium group in the resulting $\Delta^4$-3-hydroxysteroid is carried out, for example, by the modified Oppenauer method described in U.S.A. specification 3,118,881 or with manganese dioxide in known manner.

The esterification of a 17-hydroxyl group is likewise carried out in the known manner, for example by treatment of the 17$\beta$-hydroxy compound with the reactive functional derivative of an acid, for example one of the acids mentioned above, especially with their halides or anhydrides, if desired in the presence of a tertiary organic base, for example pyridine.

A 17β-hydroxyl group may be etherified, for example, by treating the 17β-hydroxy compound with a reactive ester of the alcohol concerned, for example with an alkylhalide or an alkyl or dialkyl sulphate, or with a diazolkane, or by any other known method. More especially, tetrahydropyranyl ethers can be prepared by treatment of the 17β-hydroxy compounds with dihydropyran, for example in the presence of phosphorus oxychloride.

The starting materials for the above-mentioned processes are known or, insofar as they are new, they can be prepared by known methods. Particularly valuable starting materials are, for example, $\Delta^{1,4}$-16α-methyl-6α,9α-difluoro - 11β,17α-trihydroxy-3,20-dioxo-pregnadiene (flumethasone), its 16β-methyl and 16-methylene analogues and their 11-oxo and/or 1,2-dihydro derivatives, also the corresponding 21 - desoxy and 17,21 - bisdesoxy compounds.

The invention includes also any variant of the process in which an intermediate obtained at any stage thereof is used as starting material and any remaining step/steps is/are carried out or in which a starting material is formed in situ.

The present invention includes also the manufacture of pharmaceutical preparations for use in human or veterinary medicine, containing the new pharmacologically active substances described above as active ingredients in conjunction or admixture with a pharmaceutical excipient. Suitable excipients are organic or inorganic substances suitable for enteral, for example oral, parenteral or local administration. As excipients there may be used substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be in solid form, for example tablets, dragees or capsules, or in liquid or semi-liquid form, being solutions, suspensions, emulsions, ointments or creams. The pharmaceutical preparations may be sterilized and/or contain assistants such as preserving, stabilizing, wetting or emulsifying agents, salts for regulating the osmotic pressure or buffers. They may also contain further pharmaceutically valuable substances. The new compounds may also be used as starting materials for the manufacture of other valuable compounds.

The compounds of this invention may also be used as additives to animal feedstuffs.

The following examples illustrate the invention.

EXAMPLE 1

Manufacture of $\Delta^{1,4}$-16α-methyl - 6α,9α - difluoro-11β-hydroxy - 3,17 - dioxo-androstadiene from $\Delta^{1,4}$-16α-methyl - 6α,9α - difluoro-11β,17α,21-trihydroxy-3,20-dioxo-pregnadiene (flumethasone)

A solution of 5 g. of $\Delta^{1,4}$-16α-methyl - 6α,9α-difluoro-11β,17α-21-trihydroxy-3,20 - dioxo-pregnadiene in 50 ml. of pyridine is diluted with 200 ml. of acetic acid of 60% strength, which causes slight heating up. The solution is then cooled to 20° C. and mixed with 75 g. of sodium bismuthate and the suspension is stirred for 4 hours at 20° C. The insoluble salts are suctioned off, thoroughly rinsed with acetone, the acetone is expelled from the resulting solution under vacuum at a bath temperature from 50 to 60° C. and the residue is diluted with 1500 ml. of 2 N-hydrochloric acid. The resulting suspension is agitated with ethyl acetate, and the organic phase is washed with 2 N-hydrochloric acid, with water, with 2 N-potassium bicarbonate solution and with water, dried and evaporated under vacuum. The residue is dissolved in methylenechloride, and the solution is filtered through a column of 10 g. of alumina (activity II) and the column is rinsed with methylenechloride. The combined solutions are concentrated on a waterbath the concentrate is mixed with isopropylether and the distillative removal of methylenechloride is continued, whereupon $\Delta^{1,4}$-16α-methyl-6α,9α-difluoro - 11β-hydroxy-3,17-dioxo-androstadiene crystallizes out. The crystals are suctioned off and washed with isopropyl ether and ether. The crystals start subliming at 255° C. and melt at 280–288° C. with decomposition. When the mother liquor is concentrated, it furnishes another portion of a slightly less pure substance melting at 276–281° C. with decomposition.

When the $\Delta^{1,4}$-16α-methyl - 6α,9α - difluoro - 11β-hydroxy-3,17 - dioxo-androstadiene obtained as described above is oxidized with chromium trioxide/pyridine, it yields $\Delta^{1,4}$-16α - methyl - 6α,9α - difluoro-3,11,17-trioxo-androstadiene.

A mixture of 2.6 g. of $\Delta^{1,4}$-16α-methyl-6α,9α-difluoro-11β - hydroxy - 3,17 - dioxo-androstadiene, 130 ml. of dioxane, 130 ml. of benzene and 670 g. of triphenylphosphine-rhodium chloride catalyst is agitated at room temperature, until nuclear magnetic spectroscopy identifies no more steroid-1,2-double bond. The mixture is then diluted with toluene to 1 litre and the solution filtered through a column of 134 g. of alumina (activity II) washed with 500 ml. of toluene and rinsed with 3 litres of a 7:3-mixture of toluene and ethyl acetate. The combined filtrates are evaporated and the residue is recrystallized from methylenechloride+ether, to yield $\Delta^4$-16α-methyl-6α,9α-difluoro-11β-hydroxy-3,17-dioxo-androstene.

EXAMPLE 2

1.5 g. of $\Delta^{1,4}$-16α-methyl-6α,9α-difluoro-11β-hydroxy-3,17-dioxo-androstadiene are dissolved in 15 ml. of pyridine. A solution of 1.5 g. of chromium trioxide in 3 ml. of water and 6 ml. of pyridine, cooled to 0°, is added at 0° and the mixture is left to stand at 20° for 20 hours. Ice is added to the reaction mixture and the excess of chromic acid is destroyed by the addition of sodium bisulfite. The mixture is stirred for another hour, then it is acidified with dilute hydrochloric acid and extracted with ethyl acetate. The combined extracts are washed with dilute hydrochloric acid, water, dilute potassium bicarbonate solution and again with water, then dried and evaporated in vacuo. The neutral residue does no longer show any hydroxyl band in the IR-spectrum. It is recrystallized from a mixture of methylene chloride and isopropyl ether. The $\Delta^{1,4}$-16α-methyl - 6α,9α - difluoro-3,11,17-trioxo-androstadiene of melting point 192–194° is thus obtained.

EXAMPLE 3

A pharmaceutical preparation in the form of an ointment for the topical application containing as active ingredient the $\Delta^{1,4}$-16α-methyl-6α,9α-difluoro-11β-hydroxy-3,17-dioxo-androstadiene.

Composition

| | Percent |
|---|---|
| White petroleum jelly | 65 |
| Paraffin oil | 65 |
| Higher fatty alcohols | 10 |
| Waxes | 10 |
| Polyoxyethylene sorbitan derivatives | 4.45 |
| Sorbitan fatty acid esters | 4.45 |
| Preserving agents | 0.2 |
| Perfume | 0.1 |
| Water | 18 |
| $\Delta^{1,4}$-16α-methyl-6α,9α-difluoro-11β-hydroxy-3,17-dioxo-androstadiene | 2.25 |

The fats and the emulsifiers are melted together, the preserving agents dissolved in water and the water is emulsified with the melt at an elevated temperature. While the batch cools a suspension of the active principle in part of the melt is worked into the emulsion and the perfume then added.

We claim:
1. A member selected from the group consisting of a compound of the formula

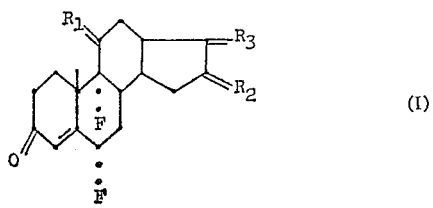

in which R₁ represents a member selected from the group consisting of a free β-positioned hydroxyl group together with hydrogen and an oxo group, R₂ a member selected from the group consisting of an α-positioned methyl group together with hydrogen, a β-positioned methyl group together with hydrogen, and a methylene group, and R₃ a member selected from the group consisting of a free, an esterified and an etherified hydroxy group together with hydrogen, each of said esterified hydroxyl groups being derived from a carboxylic acid having 1 to 18 carbon atoms and each of said etherified hydroxyl groups being derived from an alcohol having 1 to 8 carbon atoms and an oxo group, and a 1-dehydro derivative of such compound.

2. A compound as claimed in claim 1, having an esterified hydroxy group in the 17-position derived from an acid selected from the group consisting of an aliphatic, an alicyclic and aromatic and a heterocyclic carboxylic acid having from 1 to 18 carbon atoms.

3. A compound as claimed in claim 1, having an esterified hydroxyl group in the 17-position derived from a lower aliphatic carboxylic acid.

4. A compound as claimed in claim 1, having an etherified hydroxy group in the 17-position derived from an alcohol having from 1 to 8 carbon atoms.

5. A compound as claimed in claim 1, having an etherified hydroxyl group in the 17-position is derived from an alcohol selected from the group consisting of a lower aliphatic alkanol, benzyl alcohol and tetrahydropyranol.

6. $\Delta^{1,4}$ - 16α - methyl -6α,9α-difluoro-11β-hydroxy-3,17-dioxo-androstadiene.

7. $\Delta^{1,4}$-16α - methyl - 6α,9α - difluoro-11β,17β-dihydroxy-3-oxo-androstadiene.

8. $\Delta^{1,4}$-16β - methyl - 6α,9α - difluoro - 11β-hydroxy-3,17-dioxo-androstadiene.

9. $\Delta^{1,4}$-16 - methylene - 6α,9α - difluoro-11β - hydroxy-3,17-dioxo-androstadiene.

No references cited.

ELBERT L. ROBERTS, Primary Examiner

U.S. Cl. X.R.

424—243